(12) United States Patent
Asada

(10) Patent No.: US 7,671,900 B2
(45) Date of Patent: Mar. 2, 2010

(54) IMAGING APPARATUS AND ITS CONTROL METHOD DISPLAYING AN ELECTRONIC VIEWFINDER SCREEN AND A FRAME WITHIN THE SCREEN INCLUDING COLOR INFORMATION

(75) Inventor: Satoshi Asada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 779 days.

(21) Appl. No.: 11/319,160

(22) Filed: Dec. 28, 2005

(65) Prior Publication Data

US 2006/0152612 A1 Jul. 13, 2006

(30) Foreign Application Priority Data

Jan. 7, 2005 (JP) ............................. 2005-003071

(51) Int. Cl.
*H04N 9/73* (2006.01)
*G06F 15/00* (2006.01)
(52) U.S. Cl. .................................... 348/223.1; 358/1.9
(58) Field of Classification Search .............. 348/223.1; 358/1.9
See application file for complete search history.

(56) References Cited

U.S. PATENT DOCUMENTS

| 2003/0156206 A1 | 8/2003 | Ikeda et al. | ............... 348/223.1 |
| 2004/0036898 A1* | 2/2004 | Takahashi | .................... 358/1.9 |

FOREIGN PATENT DOCUMENTS

| CN | 1487737 | 4/2007 |
| EP | 0 989739 A2 | 9/1999 |
| EP | 1 339 239 | 8/2003 |
| EP | 1 389 003 | 2/2004 |
| EP | 0 989739 B1 | 1/2006 |
| JP | 07-320024 | * 12/1995 |
| JP | 7-320024 A | 12/1995 |
| JP | 2000-099717 | 4/2000 |
| JP | 2003-244723 A | 8/2003 |
| JP | 2003-299115 A | 10/2003 |
| JP | 2001-129226 A | 2/2004 |

OTHER PUBLICATIONS

Korean Office Action issued May 3, 2007.
Aug. 3, 2007 Chinese Office Action in Application No. 2006100001847.

* cited by examiner

*Primary Examiner*—Jason Chan
*Assistant Examiner*—Joel Fosselman
(74) *Attorney, Agent, or Firm*—Fitzpatrick, Cella, Harper & Scinto

(57) ABSTRACT

In an imaging apparatus having an imaging unit, an image processor, and a recording unit, an electronic viewfinder screen is displayed with an image capture frame on the basis of image data captured by the imaging unit and output from the image processor. A conversion source color is determined on the basis of color information included in the frame of an image displayed on the electronic viewfinder screen in response to a first operation input. A conversion destination color is determined on the basis of color information included in the frame of an image displayed on the electronic viewfinder screen in response to a second operation input. Color conversion parameters of the image processor are set to convert a color within a predetermined range including the conversion source color into a color within a predetermined range including the conversion destination color on a color space.

11 Claims, 14 Drawing Sheets

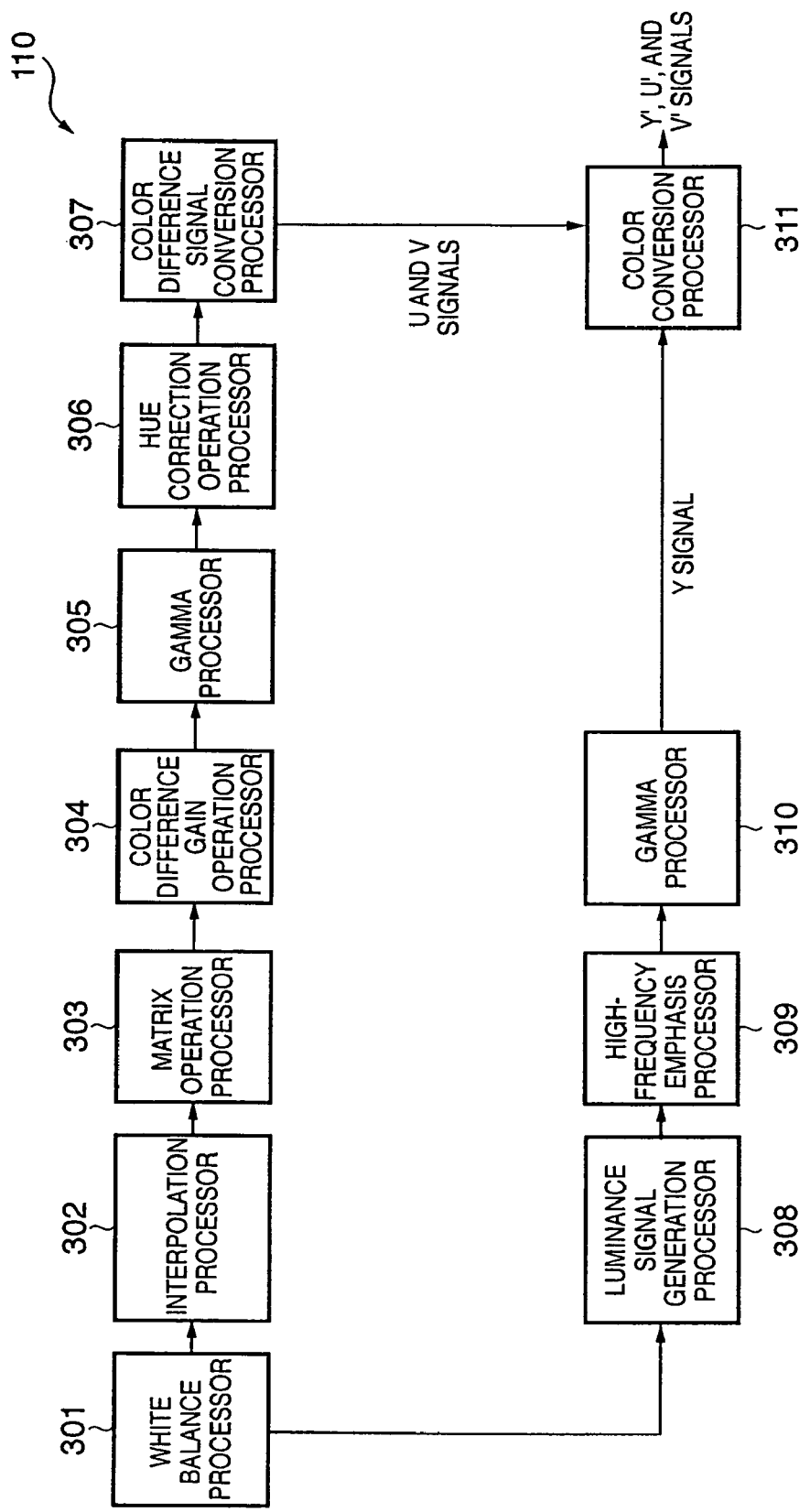

FIG. 5

| R | G1 | R | G1 | R | G1 |
|---|----|---|----|---|----|
| G2 | B | G2 | B | G2 | B |
| R | G1 | R | G1 | R | G1 |
| G2 | B | G2 | B | G2 | B |
| R | G1 | R | G1 | R | G1 |
| G2 | B | G2 | B | G2 | B |

BAYER MATRIX CCD SIGNAL

FIG. 6

| R | R | R | R | R | R |
|---|---|---|---|---|---|
| R | R | R | R | R | R |
| R | R | R | R | R | R |
| R | R | R | R | R | R |
| R | R | R | R | R | R |
| R | R | R | R | R | R |

| G1 | G1 | G1 | G1 | G1 | G1 |
|----|----|----|----|----|----|
| G1 | G1 | G1 | G1 | G1 | G1 |
| G1 | G1 | G1 | G1 | G1 | G1 |
| G1 | G1 | G1 | G1 | G1 | G1 |
| G1 | G1 | G1 | G1 | G1 | G1 |
| G1 | G1 | G1 | G1 | G1 | G1 |

| G2 | G2 | G2 | G2 | G2 | G2 |
|----|----|----|----|----|----|
| G2 | G2 | G2 | G2 | G2 | G2 |
| G2 | G2 | G2 | G2 | G2 | G2 |
| G2 | G2 | G2 | G2 | G2 | G2 |
| G2 | G2 | G2 | G2 | G2 | G2 |
| G2 | G2 | G2 | G2 | G2 | G2 |

| B | B | B | B | B | B |
|---|---|---|---|---|---|
| B | B | B | B | B | B |
| B | B | B | B | B | B |
| B | B | B | B | B | B |
| B | B | B | B | B | B |
| B | B | B | B | B | B |

BAYER INTERPOLATED SIGNAL

FIG. 7

| | | |
|---|---|---|
| 1/16 | 2/16 | 1/16 |
| 2/16 | 4/16 | 2/16 |
| 1/16 | 2/16 | 1/16 |

IMAGING APPARATUS AND ITS CONTROL METHOD DISPLAYING AN ELECTRONIC VIEWFINDER SCREEN AND A FRAME WITHIN THE SCREEN INCLUDING COLOR INFORMATION

FIELD OF THE INVENTION

The present invention relates to an imaging apparatus which allows the user to customize colors, and its control method.

BACKGROUND OF THE INVENTION

In recent years, digital cameras have prevailed in the marketplace, and many users increasingly have an opportunity to use digital cameras. For this reason, the users' needs for digital cameras are varied. As one of such needs, good color reproducibility is known. Each vendor aims, as a goal of the color reproducibility characteristics, at average color reproduction, that most users like the set color reproducibility characteristics of the camera. However, since different users have different taste, it is impossible to realize color reproducibility which meets the needs of all users.

To solve this problem, a digital camera which allows the user to customize parameters such as hue, chroma saturation, brightness, and the like to realize color reproducibility of user's choice upon imaging is available. However, since it is difficult to present the relationship between changes in these parameters and those in colors to the user, optimal camera settings require a user's skill.

As proposals associated with a method of allowing the user to adjust colors in a way that is easy to understand, Japanese Patent Laid-Open Nos. 2004-129226 and 07-320024 are known. Japanese Patent Laid-Open No. 2004-129226 describes a configuration that executes color conversion processing for converting a designated source color into a designated destination color by designating a desired source color in an image during retouch processing of an image, and designating a desired color as a conversion destination color. Also, Japanese Patent Laid-Open No. 07-320024 describes a configuration which designates an arbitrary extraction color (source color) by moving a cursor on a displayed image using a joystick. On the other hand, Japanese Patent Laid-Open No. 2003-299115 describes a configuration that captures a flesh color as a source color to be changed using an imaging apparatus, and calculates color conversion coefficients on the basis of the captured flesh color and a flesh color reproduction destination value stored in a ROM.

However, Japanese Patent Laid-Open No. 2004-129226 pertains to the retouch processing of an image, but it does not set color conversion processing upon imaging in the imaging apparatus. Also, this method is not suitable for color conversion processing on a limited user interface like that of the imaging apparatus, since that method requires the designation of the source color and destination color using the cursor. In Japanese Patent Laid-Open No. 07-320024, a desired color is designated by moving a cursor on an image. However, this method requires an operation unit for cursor movement, and is not suitable for a digital camera or the like which requires portability. Furthermore, in Japanese Patent Laid-Open No. 2003-299115, the user selects a desired destination color from several types of destination colors pre-stored in the ROM. That is, the destination colors are limited to several types, and free color conversion cannot be realized. Also, since each destination color is not presented to the user as an image, it is difficult for the user to recognize the conversion destination color.

SUMMARY OF THE INVENTION

The present invention has been made in consideration of the aforementioned problems, and has as its object to realize desired color conversion upon imaging by a simple operation by allowing the user to freely, clearly, and easily set the conversion source color and conversion target color even on a limited user interface of an imaging apparatus.

According to one aspect of the present invention, there is provided an imaging apparatus which comprises an imaging unit, an image processing unit which processes image data obtained by the imaging unit, and a recording unit which records image data output from the image processing unit, comprising: a display unit configured to display an electronic viewfinder screen on the basis of image data which is captured by the imaging unit and is output from the image processing unit, and display a frame within the screen; a first determination unit configured to determine a first color value on the basis of color information included in the frame of an image displayed on the electronic viewfinder screen in response to a first operation input; a second determination unit configured to determine a second color value on the basis of color information included in the frame of an image displayed on the electronic viewfinder screen in response to a second operation input; and a setting unit configured to set color conversion parameters of the image processing unit so as to convert a color within a predetermined range including the first color value into a color within a predetermined range including the second color value on a color space.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram for explaining image processing according to the embodiment of the present invention;

FIG. 5 is a conceptual view for explaining a color matrix of a CCD in the imaging apparatus according to the embodiment of the present invention;

FIG. 6 is a conceptual view for explaining data after interpolation of CCD signals in the imaging apparatus according to the embodiment of the present invention;

FIG. 7 is a view for explaining a filter used in brightness signal generation processing according to the embodiment of the present invention;

DETAILED DESCRIPTION OF THE PREFERRED EMBODIMENTS

Preferred embodiments of the present invention will now be described in detail in accordance with the accompanying drawings.

First Embodiment

Figure 1:
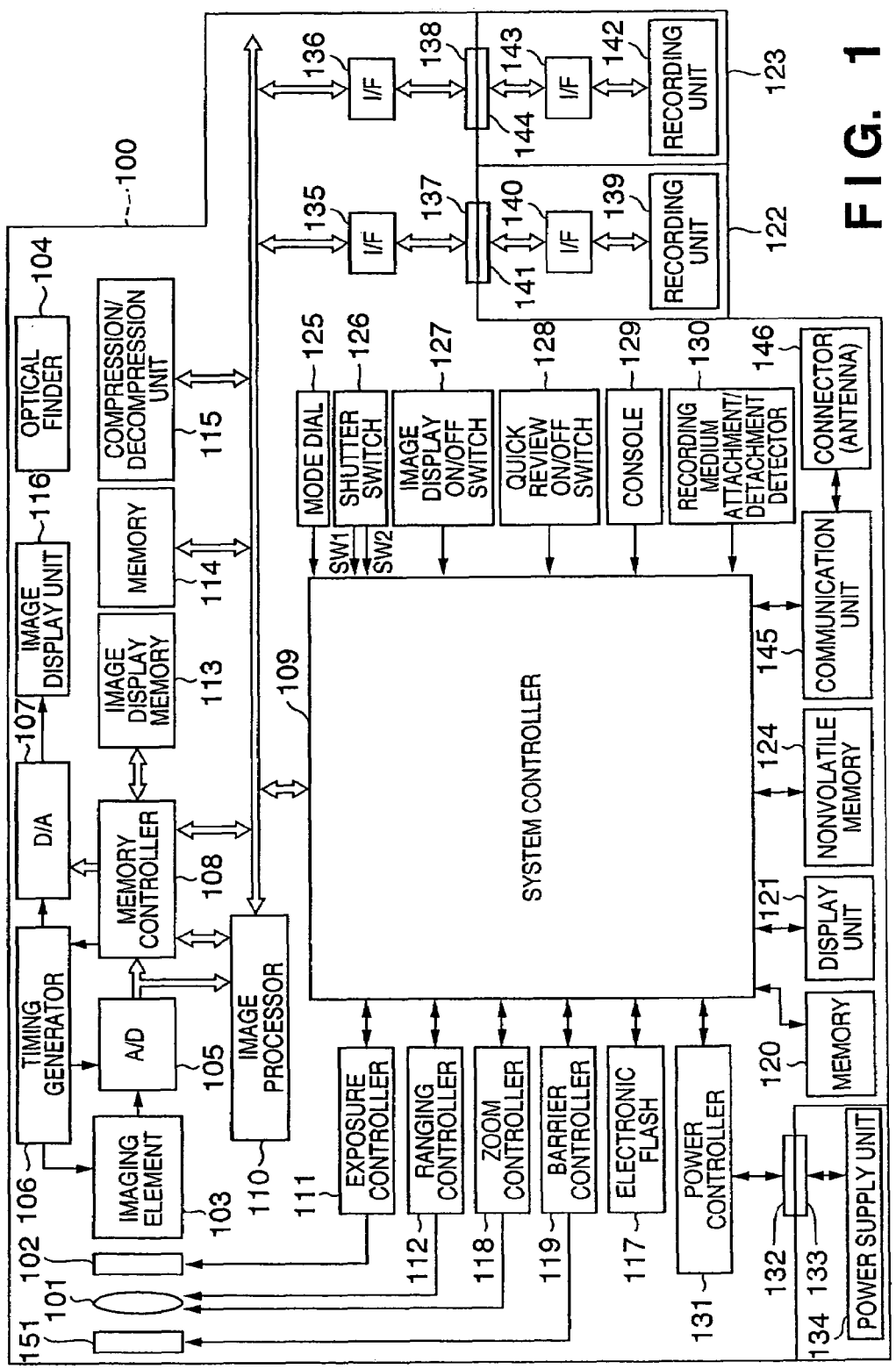
FIG. 1 is a block diagram showing the arrangement of an imaging apparatus according to an embodiment of the present invention.

FIG. 1 is a block diagram showing an example of the arrangement of an imaging apparatus 100 (a digital camera in this example) according to this embodiment. An image on a physical space is formed on an imaging element 103 that converts an optical image into an electrical signal via an imaging lens 101 and a shutter 102 with an aperture function. An A/D converter 105 converts an analog signal output from the imaging element 103 into a digital signal. A timing generator 106 is controlled by a memory controller 108 and system controller 109, and supplies clock signals and a control signal to the imaging element 103, the A/D converter 105, and a D/A converter 107.

An image processor 110 applies predetermined pixel interpolation processing and color conversion processing to data from the A/D converter 105 or the memory controller 108. The image processor 110 executes predetermined arithmetic operation processing using captured image data. The system controller 109 controls an exposure controller 111 and a ranging controller 112 on the basis of the arithmetic operation result of the image processor 110 to execute TTL (through-the-lens) AF (auto-focus) processing, AE (auto-exposure) processing, and EF (flash pre-emission) processing. Furthermore, the image processor 110 executes predetermined arithmetic operation processing using captured image data to also execute TTL AWB (auto white balance) processing on the basis of the obtained arithmetic operation result.

The memory controller 108 controls the A/D converter 105, the timing generator 106, the D/A converter 107, the image processor 110, an image display memory 113, a memory 114, and a compression/decompression unit 115. Data output from the A/D converter 105 is written in the image display memory 113 or memory 114 via the image processor 110 and the memory controller 108 or via only the memory controller 108. Note that image data is written in the image display memory 113 while being decimated in correspondence with the resolution of a display of an image display unit 116. The image data for display written in the image display memory 113 is converted into an analog signal for image display via the D/A converter 107, and the analog signal is displayed by the image display unit 116. The image display unit 116 comprises a TFT LCD or the like. When captured image data are displayed sequentially using the image display unit 116, a so-called electronic viewfinder function can be implemented. The image display unit 116 can arbitrarily turn on/off its display in accordance with an instruction from the system controller 109. When the display is OFF, power consumption of the imaging apparatus 100 can be greatly reduced.

The memory 114 is used to store captured still image data and moving image data. The memory 114 has a storage capacity large enough to store a predetermined number of still images or a moving image for a predetermined period of time. As a result, in case of continuous-shot imaging or panorama imaging that continuously captures a plurality of still images, write access of a large number of images can be made on the memory 114 at high speed. In addition, the memory 114 can be used as a work area of the system controller 109.

The compression/decompression unit 115 compresses/decompresses image data by adaptive discrete cosine transformation (ADCT) or the like. The compression/decompression unit 115 executes compression or decompression processing by loading an image stored in the memory 114, and writes the processed data in the memory 114.

The exposure controller 111 controls the shutter 102 with an aperture function, and also has a flash light control function in collaboration with an electronic flash 117. The ranging controller 112 controls focusing of the imaging lens 101. A zoom controller 118 controls zooming of the imaging lens 101. A barrier controller 119 controls the operation of a protection unit 151. The protection unit 151 serves as a barrier which covers an imaging unit including the lens 101, the shutter 102, and the imaging element 103 of the imaging apparatus 100 to protect the imaging unit from contamination and damage. In general, the protection unit 151 has as its principal object to protect the lens 101. The electronic flash 117 has a light projection function of AF auxiliary light, and the flash light control function. The exposure controller 111 and the ranging controller 112 are controlled using the TTL system. That is, the system controller 109 controls the exposure controller 111 and the ranging controller 112 on the basis of the arithmetic result of captured image data by the image processor 110. The system controller 109 controls the entire imaging apparatus 100. A memory 120 stores constants, variables, programs, and the like required to operate the system controller 109.

An indication unit 121 includes a liquid crystal display device (LCD), LEDs, and the like which presents the operation states, messages, and the like by means of text, images, and the like in accordance with execution of programs by the system controller 109. Note that the indication unit 121 may also include a loudspeaker, a piezoelectric buzzer (sound generation element), or the like, which can output a sound, a buzzer tone, or the like used to present some of the operation states, messages, and the like. The indication unit 121 may be set at one or a plurality of easy-to-see positions around a console of the imaging apparatus 100. Some functions of the indication unit 121 are set within an optical viewfinder 104.

Of the indication contents of the indication unit 121, those displayed on the LCD or the like include, e.g., a single/continuous shot indication, a self timer indication, a compression ratio indication, a recording pixel count indication, a recorded image count indication, a remaining recordable image count indication, a shutter speed indication, an aperture value indication, an exposure correction indication, a flash indication, a red-eye suppression indication, a macro imaging indication, a buzzer setting indication, a remaining timepiece battery level indication, a remaining battery level indication, an error indication, an information indication using numerals of a plurality of digits, an attachment/detachment indication of recording media 122 and 123, a communication I/F operation indication, a date/time indication, and the like. Of the indication contents of the indication unit 121, those displayed within the optical viewfinder 104 include, e.g., in-focus indication, a camera shake alert indication, a flash charging indication, a shutter speed indication, an aperture value indication, an exposure correction indication, and the like.

A nonvolatile memory 124 is an electrically erasable/recordable memory, and uses, e.g., an EEPROM or the like. Reference numerals 125, 126, 127, 128 and 129 denote operation units for inputting various operation instructions of the system controller 109. These operation units are constructed by one or a plurality of combinations of a switch, a dial, a touch panel, a pointer using line of sight detection, a voice recognition device, and the like. These operation units will be explained in detail below.

The mode dial switch 125 is used to switch and set one of various function modes: power OFF, an automatic imaging mode, an imaging mode, a panorama imaging mode, a play mode, a multi-frame playback/erasure mode, a PC connection mode, and the like. The shutter switch 126 outputs a signal SW1 in the middle of operation of a shutter button (release button) (203 in FIG. 2) (half-stroke depression of the shutter button), and outputs a signal SW2 upon completion of operation of the shutter button (full-stroke depression of the shutter button). The signal SW1 instructs to start the operations such as AF (auto-focus) processing, AE (auto exposure) processing, AWB (auto white balance) processing, EF (flash pre-emission) processing, and the like. The signal SW2 instructs to start the operation of a series of imaging processes including exposure processing, development processing, and recording processing. In the exposure processing, a signal read out from the imaging element 103 is converted into digital data by the A/D converter 105. The converted digital data may be written in the memory 114 as image data (RAW data) via the memory controller 108. In the development processing, the exposure-processed signal undergoes arithmetic operation processing (development processing) by the image processor 110 and the memory controller 108, and the processed signal is written in the memory 114. In the recording processing, the development-processed image data is read out from the memory 114, is compressed by the compression/decompression unit 115, and is written in the recording medium 122 or 123.

The image display ON/OFF switch 127 is used to set ON/OFF of the image display unit 116. With this function, when power supply to the image display unit 116 comprising a TFT LCD and the like is cut off upon imaging using the optical viewfinder 104, power savings can be attained. The quick review ON/OFF switch 129 is used to set ON/OFF of a quick review function of automatically playing back captured image data immediately after imaging. Note that the device is equipped with a function of setting the quick review function when the image display unit 116 is OFF.

The console 129 includes various buttons, a touch panel, and the like, and functions as various operation instruction buttons by one switch or combinations of a plurality of switches. Such operation instruction buttons include, for example, a menu button, a set button, a macro button, a multi-frame playback new page button, a flash setting button, a single-shot/continuous-shot/self-timer select button, a menu upward move (up arrow) button, a menu downward move (down arrow) button, a playback image next move (right arrow) button, a playback image back move (left arrow) button, a captured image quality select button, an exposure correction button, a date/time setting button, an image delete button, an image delete cancel button, and the like.

A power supply controller 131 is comprised of a battery detection circuit, a DC-DC converter, a switch circuit for switching blocks to be energized, and the like. The power supply controller 131 detects the presence/absence of attachment, the type, and the remaining battery level of a battery, controls the DC-DC converter on the basis of such detection results and an instruction from the system controller 109, and supplies a required voltage to the respective units including the recording media for a required period of time. A power supply unit 134 includes a primary battery such as an alkali battery, a lithium battery, or the like, a secondary battery such as an NiCd battery, an NiMH battery, an Li battery, or the like, an AC adapter, and the like. The power supply unit 134 is connected to the power supply controller 131 via connectors 132 and 133.

Interfaces 135 and 136 connect recording media, such as a memory card, a hard disk, and the like, to the bus in the imaging apparatus 100. Connection between the recording media, such as a memory card, a hard disk, and the like, and the interfaces 135 and 136, are attained via connectors 137 and 138. A recording medium attachment/detachment detector 130 detects whether or not the recording medium 122 and/or the recording medium 123 are/is attached to the connector 137 and/or the connector 138.

Note that this embodiment has two sets of interfaces and connectors that receive the recording media. However, the number of sets of interfaces and connectors that receive the recording media is not particularly limited. Also, combinations of interfaces and connectors of different standards may be used. As the interface and connector, those compatible to the standards of a PCMCIA card, CF (Compact Flash®) card, and the like may be used.

Furthermore, the interfaces 135 and 136, and connectors 137 and 138 may use those compatible with the standards of a PCMCIA card, a CF (Compact Flash®) card, and the like. In this case, various communication cards such as a LAN card, a modem card, a USB card, an IEEE1394 card, a P1284 card, a SCSI card, a PHS, and the like can be connected. By connecting such communication cards, image data and associated management information can be exchanged with another computer or its peripheral devices such as a printer and the like.

The optical viewfinder 104 alone can be used to allow imaging without using the electronic viewfinder function implemented by the image display unit 116. In the optical viewfinder 104, some functions of the indication unit 121, e.g., an in-focus indication, a camera shake alert indication, a flash charging indication, a shutter speed indication, an aperture value indication, an exposure correction indication, and the like are provided, as described above.

A communication unit 145 has various communication functions such as an RS232C function, a USB function, an IEEE1394 function, a P1284 function, a SCSI function, a modem function, a LAN function, a wireless communication function, and the like. A connection unit 146 is a connector used to the imaging apparatus 100 and another apparatus using the communication unit 145. Alternatively, in case of a wireless communication, the connection unit 146 is an antenna.

The recording media 122 and 123 comprise recording units 139 and 142, such as a semiconductor memory, a magnetic disk, and the like, interfaces 140 and 143 with the imaging apparatus 100, and connectors 141 and 144 used to connect the imaging apparatus 100.

Figure 2:
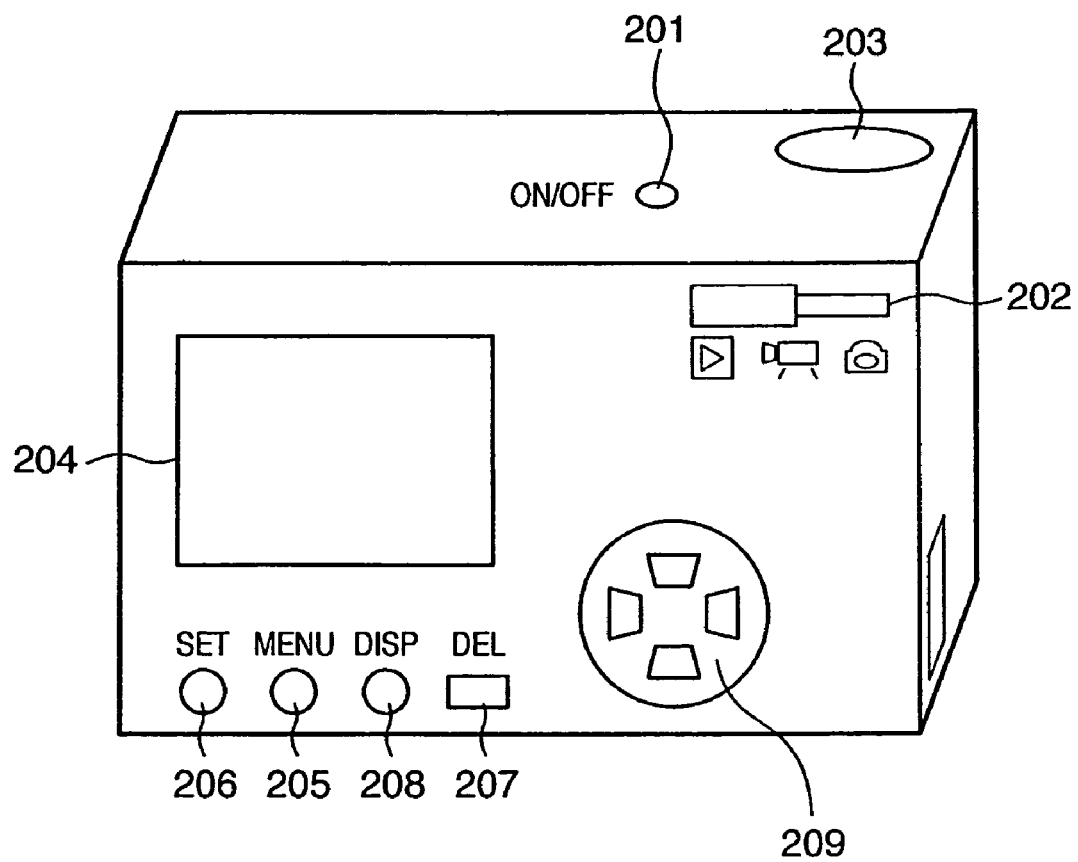
FIG. 2 shows the outer appearance of the imaging apparatus according to the embodiment of the present invention.

FIG. 2 is a perspective view of the imaging apparatus 100 (digital camera). A power switch 201 is a button used to turn on/off the power supply. Reference numerals 202, and 205 to 209 denote some components which form the aforementioned console 129. The mode change lever 202 is used to switch and set various function modes, such as an imaging mode, a play mode, a moving image capture mode, a still image capture mode, and the like. A shutter button 203 serves as the aforementioned shutter switch 126. An LCD 204 forms a part of the image display unit 116 to serve as an electronic viewfinder, and displays a screen obtained by playing back a still image and/or a moving image. The menu button 205 is a switch used to turn on/off a menu screen used to change imaging parameters and camera settings. The set button 206 is used in selection, determination, and the like on the menu screen displayed upon operation of the menu button 205. The delete button 207 is used to designate deletion of an image. The display button 208 forms the aforementioned image display ON/OFF switch 127, and is used to switch the presence/absence of display on the LCD 204. The cross key 209, having arrow buttons of a plurality of directions, can be used to shift items on the menu screen using its up, down, right, and left arrow buttons, and to shift images by pressing its right or left arrow button in the play mode.

FIG. 3 is a block diagram for explaining the processing in the image processor 110 in the digital camera 100 according to this embodiment. Note that parameter values used in respective processes to be described below (parameters for a matrix operation and those of a 3D lookup table) are stored in the memory 120, and are read out by the image processor 110 as needed. A CCD digital signal which is A/D-converted by the A/D converter 105 undergoes white balance processing by a white balance processor 301 first. A description of the white balance processing will be omitted here, but the processing can be implemented using a method described in, e.g., Japanese Patent Laid-Open No. 2003-244723. The CCD digital signal that has undergone the white balance processing is supplied to an interpolation processor 302. Assume that the imaging element 103 of this embodiment has a color filter of a Bayer matrix, as shown in FIG. 5. Therefore, the interpolation processor 302 executes processing for converting CCD Bayer matrix data shown in FIG. 5 into interpolated data R, G1, G2, and B shown in FIG. 6. The interpolated CCD digital signal is input to a matrix operation processor 303, and undergoes a 4×3 matrix operation given by:

$$\begin{vmatrix} Rm \\ Gm \\ Bm \end{vmatrix} = \begin{vmatrix} M11 & M21 & M31 & M41 \\ M12 & M22 & M32 & M42 \\ M13 & M23 & M33 & M43 \end{vmatrix} \begin{vmatrix} R \\ G1 \\ G2 \\ B \end{vmatrix} \quad (1)$$

to obtain Rm, Gm, and Bm.

The CCD digital signal that has undergone the matrix operation processing is input to a color difference gain operation processor 304, which multiplies color difference signals by a gain. That is, the Rm, Gm, and Bm signals are converted into Y, Cr, and Cb signals by:

$$\begin{vmatrix} Y \\ Cr \\ Cb \end{vmatrix} = \begin{vmatrix} 0.3 & 0.59 & 0.11 \\ 0.7 & -0.59 & -0.11 \\ -0.3 & -0.59 & 0.89 \end{vmatrix} \begin{vmatrix} Rm \\ Gm \\ Bm \end{vmatrix} \quad (2)$$

Then, the obtained Cr and Cb signals are multiplied by a gain according to:

$$Cr' = G1 \times Cr$$

$$Cb' = G1 \times Cb \quad (3)$$

After that, these signals are converted into Rg, Gg, and Bg signals by an inverse matrix operation of formula (2), i.e., by:

$$\begin{vmatrix} Rg \\ Gg \\ Bg \end{vmatrix} = \begin{vmatrix} 0.3 & 0.59 & 0.11 \\ 0.7 & -0.59 & -0.11 \\ -0.3 & -0.59 & 0.89 \end{vmatrix}^{-1} \begin{vmatrix} Y \\ Cr' \\ Cb' \end{vmatrix} \quad (4)$$

The CCD digital signal that has undergone the color difference gain operation processing is sent to a gamma processor 305. The gamma processor 305 performs gamma conversion of the CCD digital signal using:

$$Rt = \text{GammaTable}[Rg] \quad (5)$$

$$Gt = \text{GammaTable}[Gg] \quad (6)$$

$$Bt = \text{GammaTable}[Bg] \quad (7)$$

where GammaTable is a one-dimensional (1D) lookup table.

The CCD digital signal that has undergone the gamma processing is sent to a hue correction operation processor 306. The hue correction operation processor 306 converts the Rt, Gt, and Bt signals into Y, Cr, and Cb signals by:

$$\begin{vmatrix} Y \\ Cr \\ Cb \end{vmatrix} = \begin{vmatrix} 0.3 & 0.59 & 0.11 \\ 0.7 & -0.59 & -0.11 \\ -0.3 & -0.59 & 0.89 \end{vmatrix} \begin{vmatrix} Rt \\ Gt \\ Bt \end{vmatrix} \quad (8)$$

Furthermore, the hue correction operation processor 306 corrects the Cr and Cb signals by:

$$\begin{vmatrix} Cr' \\ Cb' \end{vmatrix} = \begin{vmatrix} H11 & H21 \\ H12 & H22 \end{vmatrix} \begin{vmatrix} Cr \\ Cb \end{vmatrix} \quad (9)$$

After that, the hue correction operation processor 306 converts these signals into Rh, Gh, and Bh signals by an inverse matrix operation of formula (9), i.e., by:

$$\begin{vmatrix} Rh \\ Gh \\ Bh \end{vmatrix} = \begin{vmatrix} 0.3 & 0.59 & 0.11 \\ 0.7 & -0.59 & -0.11 \\ -0.3 & -0.59 & 0.89 \end{vmatrix}^{-1} \begin{vmatrix} Y \\ Cr' \\ Cb' \end{vmatrix} \quad (10)$$

The CCD digital signal which has been processed by the hue correction operation processor 306 is sent to a color difference signal conversion processor 307. The color difference signal conversion processor 307 generates U and V signals from the Rh, Gh, and Bh signals using:

$$\begin{vmatrix} U \\ V \end{vmatrix} = \begin{vmatrix} -0.169 & -0.333 & 0.502 \\ 0.499 & -0.421 & -0.078 \end{vmatrix} \begin{vmatrix} Rh \\ Gh \\ Bh \end{vmatrix} \quad (11)$$

Figure 7:
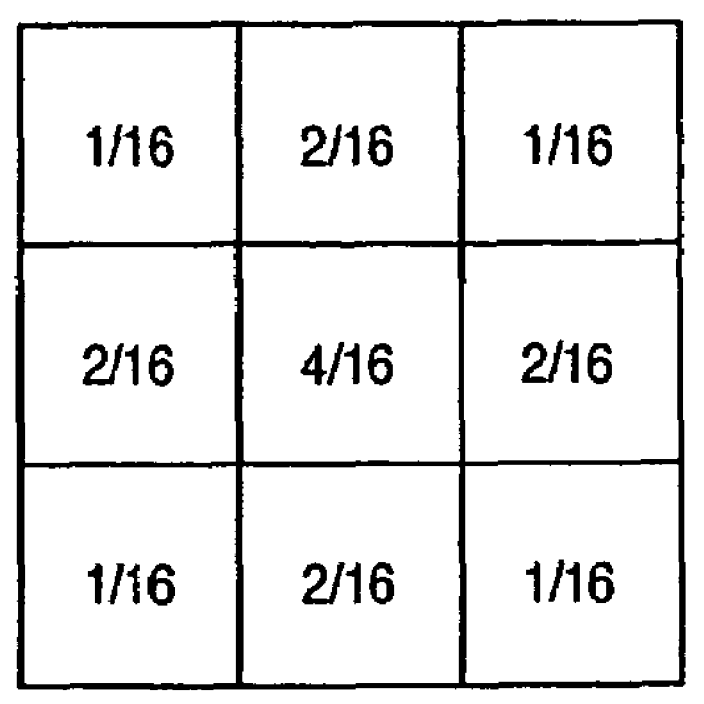

On the other hand, the CCD digital signal that has undergone the white balance processing by the white balance processor 301 is also supplied to a luminance signal generation processor 308. The luminance signal generation processor 308 converts the CCD digital signal into a luminance signal. For example, a luminance signal in case of a primary color filter shown in FIG. 5 is obtained by setting all R and B signal components to be zero, and applying two-dimensional (2D) filter processing with coefficients shown in FIG. 7. Note that a luminance signal in case of a complementary color filter is obtained by directly applying the 2D filter processing with coefficients shown in FIG. 7. The luminance signal generated by the luminance signal generation processor 308 undergoes edge emphasis processing by a high-frequency emphasis processor 309, and also undergoes gamma conversion processing by a gamma processor 310 to generate a Y signal.

The Y signal output from the gamma processor 310 and the U and V signals output from the color difference signal conversion processor 307 are converted into Y', U', and V' signals by a color conversion processor 311. The color conversion processor 311 executes conversion processing using a 3D lookup table. Details of this processing will be described later.

Figure 8A:
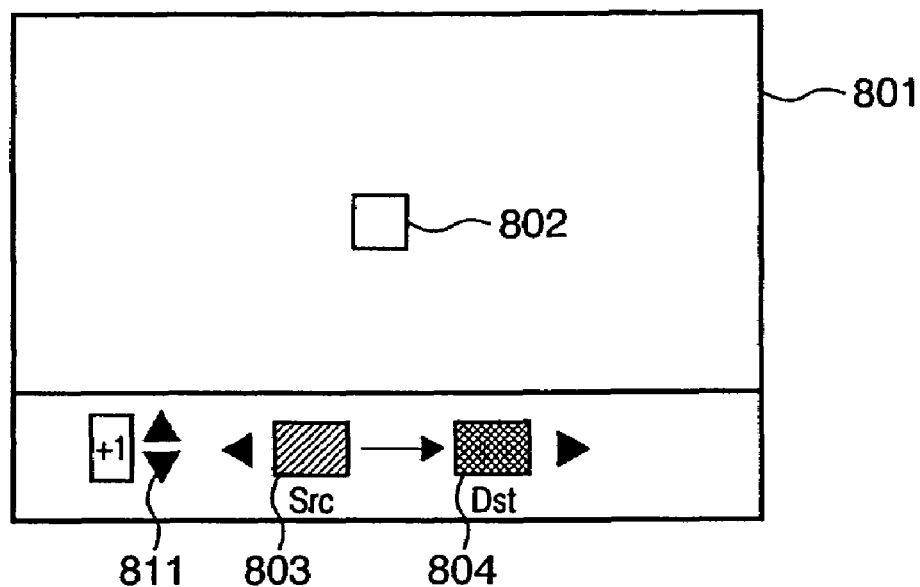
FIGS. 8A and 8B show EVF screen examples in a conversion source color/conversion destination color capture mode according to the embodiment of the present invention.
Figure 8B:
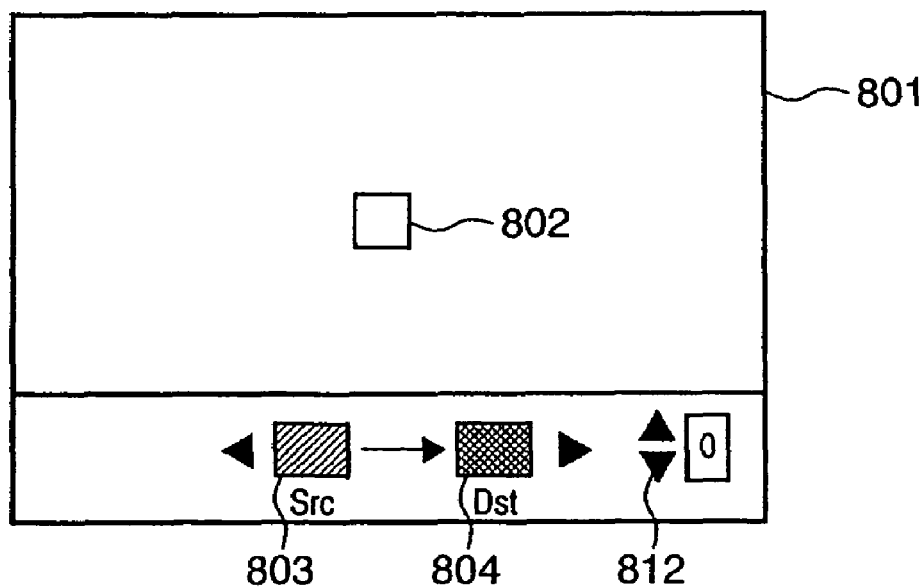

The digital camera (imaging apparatus 100) of this embodiment has an imaging mode (to be referred to as a color conversion mode hereinafter) that can convert an arbitrary color designated by the user into another arbitrary color designated by the user. In this color conversion mode, an electronic viewfinder (EVF) screen 801 shown in FIG. 8A or 8B is displayed on the LCD 204, so that a desired color falls within a color capture frame 802 in a captured image which is displayed in real time. By making a predetermined operation while the desired color falls within the color capture frame 802, the image color within the color capture frame 802 is determined as a conversion source color or conversion destination color. After the conversion source color and conversion destination colors are determined, a lookup table of the color conversion processor 311 is set so as to convert the determined conversion source color into the conversion destination color. As a result, an image displayed on the EVF screen 801 and a captured image recorded upon operation of the shutter button 203 become those in which the conversion source color is converted into the conversion destination color. The color conversion mode of this embodiment will be described in detail below.

Figure 9:
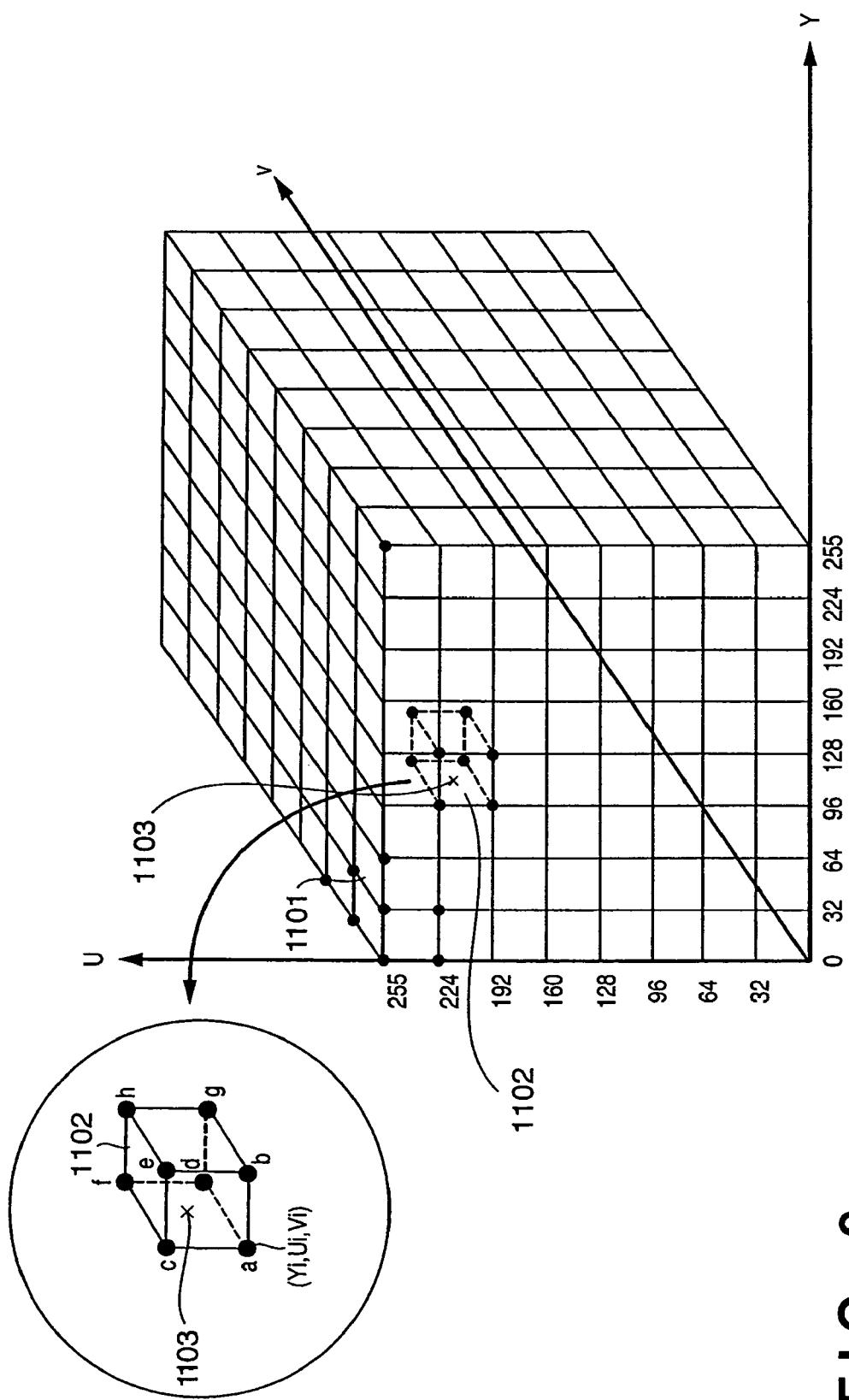
FIG. 9 is a view for explaining color conversion processing by a three-dimensional (3D) lookup table.

The color conversion processing from the conversion source color into the conversion destination color in the color conversion mode will be described first. The color conversion processor 311 converts Y, U, and V signals into Y', U', and V' signals by the 3D lookup table. In this embodiment, in order to reduce the 3D lookup table size, a list (lookup table) of Y, U, and V values of 729 (=9×9×9) 3D representative grid points obtained by dividing ranges from a minimum value to a maximum value of Y, U, and V signals into 8 are prepared. Note that Y, U, and V signals other than those at the representative grid points are calculated by interpolation. FIG. 9 conceptually shows a 3D lookup table of this embodiment. At each grid point, converted Y, U, and V values are set. For example, a grid point 1101 is a point of (32, 255, 32), and the values (32, 255, 32) are assigned to the grid point 1101 if values before and after conversion remain unchanged. On the other hand, if the grid point 1101 assumes values (32, 230, 28) after conversion, these values are set at the grid point 1101.

For example, Y, U, and V values at a point 1103 in a cubic grid 1102 in FIG. 9 are calculated by interpolation operations from Y, U, and V values at respective grid points (a to h) corresponding to the vertices of the cubic grid 1102. The interpolation operations are implemented by:

$$Y = Y_i + Y_f$$

$$U = U_i + U_f$$

$$V = V_i + V_f$$

$Y_{out}(Y,U,V) = Y_{out}(Y_i+Y_f, U_i+U_f, V_i+V_f) = (Y_{out}(Y_i, U_i, V_i) \times (Step-Y_f) \times (Step-U_f) \times (Step-V_f) + Y_{out}(Y_i+Step, U_i, V_i) \times (Y_f) \times (Step-U_f) \times (Step-V_f) + Y_{out}(Y_i, U_i+Step, V_i) \times (Step-Y_f) \times (U_f) \times (Step-V_f) + Y_{out}(Y_i, U_i, V_i+Step) \times (Step-Y_f) \times (Step-U_f) \times (V_f) + Y_{out}(Y_i+Step, U_i+Step, V_i) \times (Y_f) \times (U_f) \times (Step-V_f) + Y_{out}(Y_i+Step, U_i, V_i+Step) \times (Y_f) \times (Step-U_f) \times (V_f) + Y_{out}(Y_i, U_i+Step, V_i+Step) \times (Step-Y_f) \times (U_f) \times (V_f) + Y_{out}(Y_i+Step, U_i+Step, V_i+Step) \times (Y_f) \times (U_f) \times (V_f))/(Step \times Step \times Step)$ \hfill (12)

$U_{out}(Y,U,V) = U_{out}(Y_i+Y_f, U_i+U_f, V_i+V_f) = (U_{out}(Y_i, U_i, V_i) \times (Step-Y_f) \times (Step-U_f) \times (Step-V_f) + U_{out}(Y_i+Step, U_i, V_i) \times (Y_f) \times (Step-U_f) \times (Step-V_f) + U_{out}(Y_i, U_i+Step, V_i) \times (Step-Y_f) \times (U_f) \times (Step-V_f) + U_{out}(Y_i, U_i, V_i+Step) \times (Step-Y_f) \times (Step-U_f) \times (V_f) + U_{out}(Y_i+Step, U_i+Step, V_i) \times (Y_f) \times (U_f) \times (Step-V_f) + U_{out}(Y_i+Step, U_i, V_i+Step) \times (Y_f) \times (Step-U_f) \times (V_f) + U_{out}(Y_i, U_i+Step, V_i+Step) \times (Step-Y_f) \times (U_f) \times (V_f) + U_{out}(Y_i+Step, U_i+Step, V_i+Step) \times (Y_f) \times (U_f) \times (V_f))/(Step \times Step \times Step)$ \hfill (13)

$V_{out}(Y,U,V) = V_{out}(Y_i+Y_f, U_i+U_f, V_i+V_f) = (V_{out}(Y_i, U_i, V_i) \times (Step-Y_f) \times (Step-U_f) \times (Step-V_f) + V_{out}(Y_i+Step, U_i, V_i) \times (Y_f) \times (Step-U_f) \times (Step-V_f) + V_{out}(Y_i, U_i+Step, V_i) \times (Step-Y_f) \times (U_f) \times (Step-V_f) + V_{out}(Y_i, U_i, V_i+Step) \times (Step-Y_f) \times (Step-U_f) \times (V_f) + V_{out}(Y_i+Step, U_i+Step, V_i) \times (Y_f) \times (U_f) \times (Step-V_f) + V_{out}(Y_i+Step, U_i, V_i+Step) \times (Y_f) \times (Step-U_f) \times (V_f) + V_{out}(Y_i, U_i+Step, V_i+Step) \times (Step-Y_f) \times (U_f) \times (V_f) + V_{out}(Y_i+Step, U_i+Step, V_i+Step) \times (Y_f) \times (U_f) \times (V_f))/(Step \times Step \times Step)$ \hfill (14)

where Y, U, and V are the input Y, U, and V signals, and Yout(Y, U, V), Uout(Y, U, V), and Vout(Y, U, V) are the output Y, U, and V signals at that time. Also, Yi, Ui, and Vi are signals at a representative grid point (a in FIG. 9) whose values are smaller than Y, U, and V signal values of the input Y, U, and V signals, and are closest to these signal values. Furthermore, Yout(Yi, Ui, Vi), Uout(Yi, Ui, Vi), and Vout(Yi, Ui, Vi) are representative grid point output signals, and Step (=32 in this embodiment) is the step width of representative grid points. Therefore, for example, signals at a grid point b are expressed by Yi+Step, Ui, and Vi, and signals at a grid point c are expressed by Yi, Ui+Step, and Vi.

In the following description, the lookup table conversion and interpolation operation formulas given by formulas (12), (13), and (14) are simply expressed by:

$(Y_{out}, U_{out}, V_{out}) = LUT[(Y, U, V)]$ \hfill (15)

where Y, U, and V are input signal values, LUT is the 9×9×9 lookup table shown in FIG. 9, and Yout, Uout, and Vout are the results (Y', U', and V' in FIG. 3) of the lookup table conversion and interpolation operations. That is, the color conversion processor 311 executes the conversion processing given by formula (15) above.

As described above, after the conversion source color and the conversion destination color are determined in the color conversion mode, a cubic grid which includes the conversion source color is determined, and the values of respective grid points which form the cubic grid are changed to have the conversion destination color at the coordinate position of the conversion source color. For example, if the conversion source color determined in FIG. 9 has Y, U, and V values at a grid point 1103, the values of grid points a to h of the cubic grid 1102 are changed so that the Y, U, and V values at the point 1103 become those of the set conversion destination color upon execution of the interpolation processing described by formula (15). Although a detailed description of this processing will be omitted, the values of representative grid points after the change are mathematically calculated. The color conversion processor 311 executes the color conversion processing using the 3D lookup table after the change. In the following description, such changes in value of grid points will be referred to as parameter settings.

As described above, since color conversion is done by determining grid point data of the 3D lookup table on the basis of the designated conversion source color and conversion destination color, a color setting of a user's choice can be easily given to an image to be played back. In the above color conversion processing, only representative grid points near the color to be changed are changed. For this reason, only some colors can be easily and quickly converted into those of user's choice. That is, since no parameters which are used in the matrix operation processor 303, the color difference signal gain operation processor 304, the gamma processor 305, hue correction operation processor 306, and the like are changed, only a desired color (color region) can be changed.

Figure 4A:
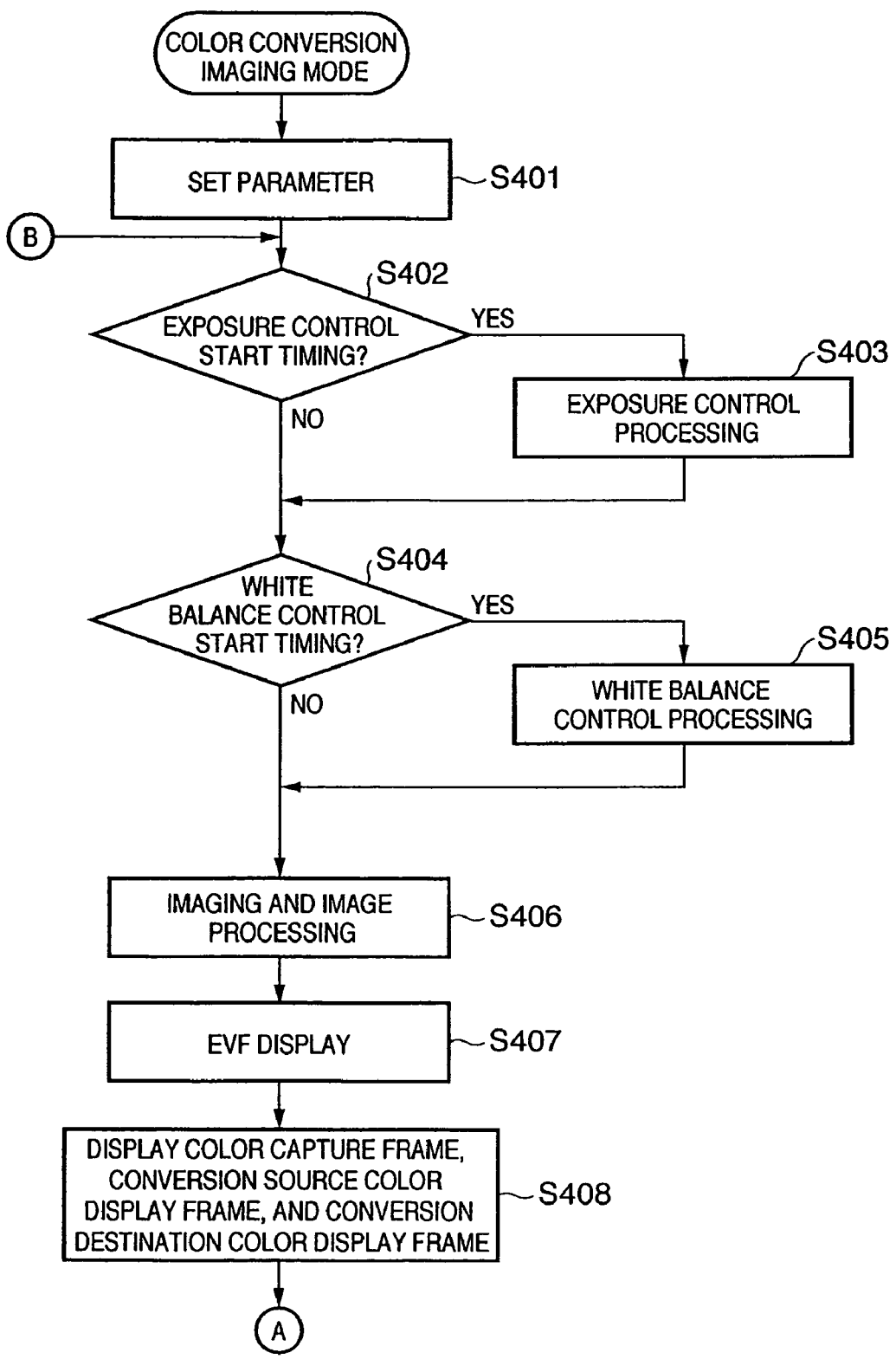
FIGS. 4A and 4B show a flowchart for explaining processing in a color conversion mode according to the embodiment of the present invention.
Figure 4B:
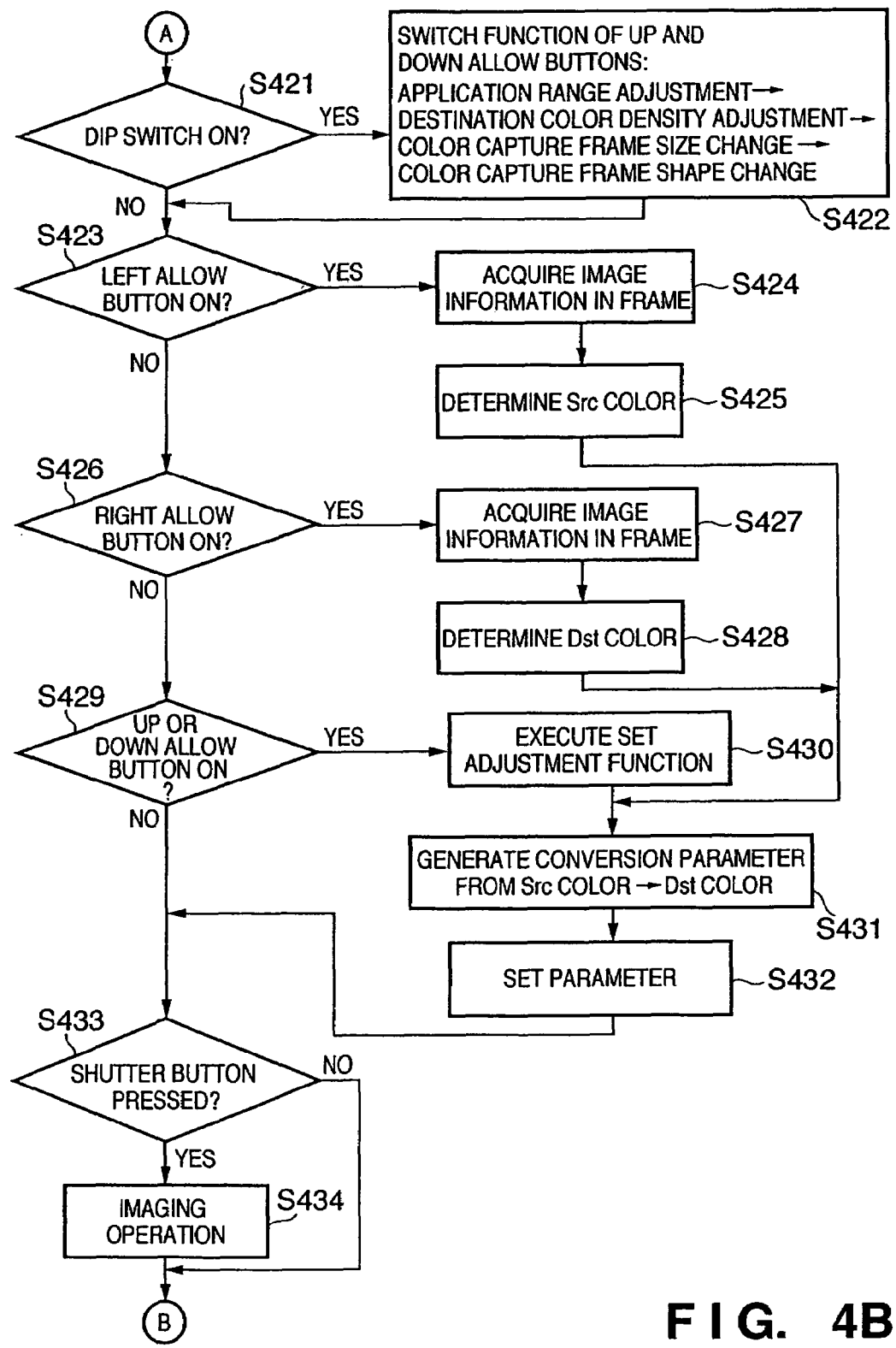

FIGS. 4A and 4B are flowcharts for explaining the processing of the digital camera of this embodiment upon imaging in the color conversion mode. Since a normal imaging mode other than the color conversion mode is the same as that in the operation of a general digital camera, the description will be limited to that of the color conversion mode. Note that the processing to be described below is mainly executed by the system controller 109.

If the user sets the imaging mode of the digital camera in the color conversion mode, previous setting parameters set in the previous color conversion mode are set as those of the color conversion processor 311 in step S401. The system controller 109 checks in step S402 if an exposure control start timing is reached. If the exposure control start timing is reached, the exposure processing is executed by the exposure controller 111 in step S403. This exposure processing includes exposure settings required to display an image on the EVF. If this exposure processing is executed frequently, it causes flickering of the screen. Hence, the execution interval of the exposure processing is set based on a time constant. For example, the time constant is set to execute the exposure processing once per two seconds. Therefore, YES is determined in step S402 at this time interval, and exposure control is done in step S403.

The system controller 109 checks in step S404 if a white balance control start timing is reached. If the white balance control start timing is reached, the flow advances to step S405 to execute the white balance control processing. If the white balance control processing is executed frequently, it also causes flickering of the screen as in the exposure processing. Hence, the time constant is set to execute the white balance control processing, e.g., once per five seconds. In the white balance control processing, white balance coefficients required to execute white balance processing are obtained to update those used in the image processor 110.

In step S406, imaging is executed to have an aperture value set in the exposure control in step S403, and the image processor 110 applies image processing to a through image as a real-time output from the imaging element using the white balance coefficients set in step S405. In step S407, the image data, which has undergone the image processing in step S406, is displayed on the LCD 204 (image display unit 116) which serves as the EVF. Furthermore, in step S408 the color capture frame 802, a conversion source color display frame 803, and a conversion destination color display frame 804 shown in FIG. 8A or 8B are displayed to be superimposed on the image displayed on the EVF.

With the processes in steps S406 and S407, the EVF screen 801 shown in FIG. 8A or 8B is displayed on the LCD 204. As shown in FIG. 8A, the EVF screen 801, color capture frame 802, conversion source color display frame 803, and conversion destination color display frame 804 are displayed on the LCD 204, in the color conversion mode. In this state, by predetermined operations using the console 129, settings of the conversion source color and conversion destination color for the aforementioned "parameter settings" (steps S423 to S428, S431, and S432), adjustment of conditions (the application range of the conversion source color, the density of the conversion destination color, the size and shape of the color capture frame, and the like) associated with "parameter settings" (steps S429 and S430), and capturing of an image upon operation of the shutter button 203 (steps S433 and S434) can be executed.

An arrow is displayed between the conversion source color display frame 803 and the conversion destination color display frame 804 to indicate the direction of color conversion in an easy-to-understand manner. Note that the adjustment of the application range of the conversion source color will be referred to as an "application range adjustment" hereinafter (to be described in detail later). Also, the adjustment of the density of the conversion destination color will be referred to as a "conversion destination color density adjustment" hereinafter.

In this embodiment, buttons arranged in the horizontal direction of the cross key 209 are used in operations for setting the conversion source color and the conversion destination color. More specifically, the left arrow button of the cross key 209 is used to set the conversion source color, and the right arrow button is used to set the conversion destination color. The display positional relationship between the conversion source color display frame 803 and the conversion destination color display frame 804 follows assignment of these operation buttons, thus allowing more intuitive operations of the user. When the release button is pressed by an index finger while the imaging apparatus is held by the right hand upon imaging, the cross key 209 is located at the position where it can be operated by a thumb. Hence, the user can also make the color conversion operation in the same address as that upon imaging.

Furthermore, in this embodiment, buttons arranged in the vertical direction of the cross key 209 are used to adjust the conditions associated with "parameter settings". A display mark 811 is displayed when "application range adjustment" is assigned to the buttons in the vertical direction. Also, a display mark 812 is displayed when "conversion destination color density adjustment" is assigned to the buttons in the vertical direction. In this embodiment, the display button 208 serves as a switch used to instruct the apparatus to change the adjustment function assigned to the up and down arrow buttons in the color conversion mode. Every time the display button 208 is pressed, the function of the up and down arrow buttons is changed in turn like application range adjustment→destination color density adjustment→color capture frame size change→color capture frame shape change→application range adjustment, . . . (steps S421 and S422). Note that the "capture frame size change" changes the size of the color capture frame 802, and the "capture frame shape change" changes the shape of the color capture frame 802.

How to set the conversion source color and the conversion destination color in the imaging apparatus of this embodiment will be described below. In order to designate the conversion source color, the user adjusts the direction and optical zooming of the imaging apparatus 100 to set a field angle so as to fully display a desired color within the color capture frame 802. Upon depression of the left arrow button of the cross key 209, it is determined that a conversion source color capture instruction is input, and the flow advances from step S423 to step S424. Pixel data of an image within the color capture frame 802 at that time are acquired in step S424, and their average value is calculated and is determined as a conversion source color (Src color) in step S425. After the conversion source color is determined, a patch indicating the conversion source color is displayed within the conversion source color display frame 803.

Likewise, in order to determine the conversion destination color, the user adjusts the imaging apparatus 100 to fully display a desired color within the color capture frame 802, and then presses the right arrow button of the cross key 209. Upon depression of the right arrow button of the cross key 209, it is determined that a conversion destination color capture instruction is input, and the flow advances from step S426 to step S427. Pixel data of an image within the color capture frame 802 at that time are acquired in step S427, and their average value is calculated and is determined as a conversion destination color (Dst color) in step S428. After the conversion source color is determined, a patch indicating the conversion destination color is displayed within the conversion destination color display frame 804.

As described above, the average of pixel values within the color capture frame 802 is calculated in steps S425 and S428. Pixel data used in such case may be either image data decimated for display on the electronic viewfinder (image data stored in the image display memory 113) or image data stored in the memory 114.

After the conversion source color or conversion destination color is determined in step S425 or S428, the flow advances to step S431. In step S431, conversion parameters required to convert the conversion source color into the conversion destination color are determined. In this embodiment, as has been described above using FIG. 9 and the like, the values of grid points which form a cubic grid that includes the conversion source color of the 3D lookup table are changed. In step S432, the 3D lookup table of the color conversion processor 311 is updated. In the subsequent image processing of the image processor 110 upon image display on the EVF (steps S406 and S407) or upon execution of imaging (steps S433 and S434), the 3D lookup table updated in the color conversion processor 311 is used. Upon execution of imaging, a signal SW1 is generated at the half-stroke position of the shutter button 203 to execute AF (auto-focus) processing, AE (auto exposure control) processing, AWB (auto white balance) processing, EF (flash pre-emission) processing, and the like for imaging. A signal SW2 is generated at the full-stroke position of the shutter button 203 to execute a series of imaging processes including the exposure processing, the development processing, and the recording processing.

Figure 10:
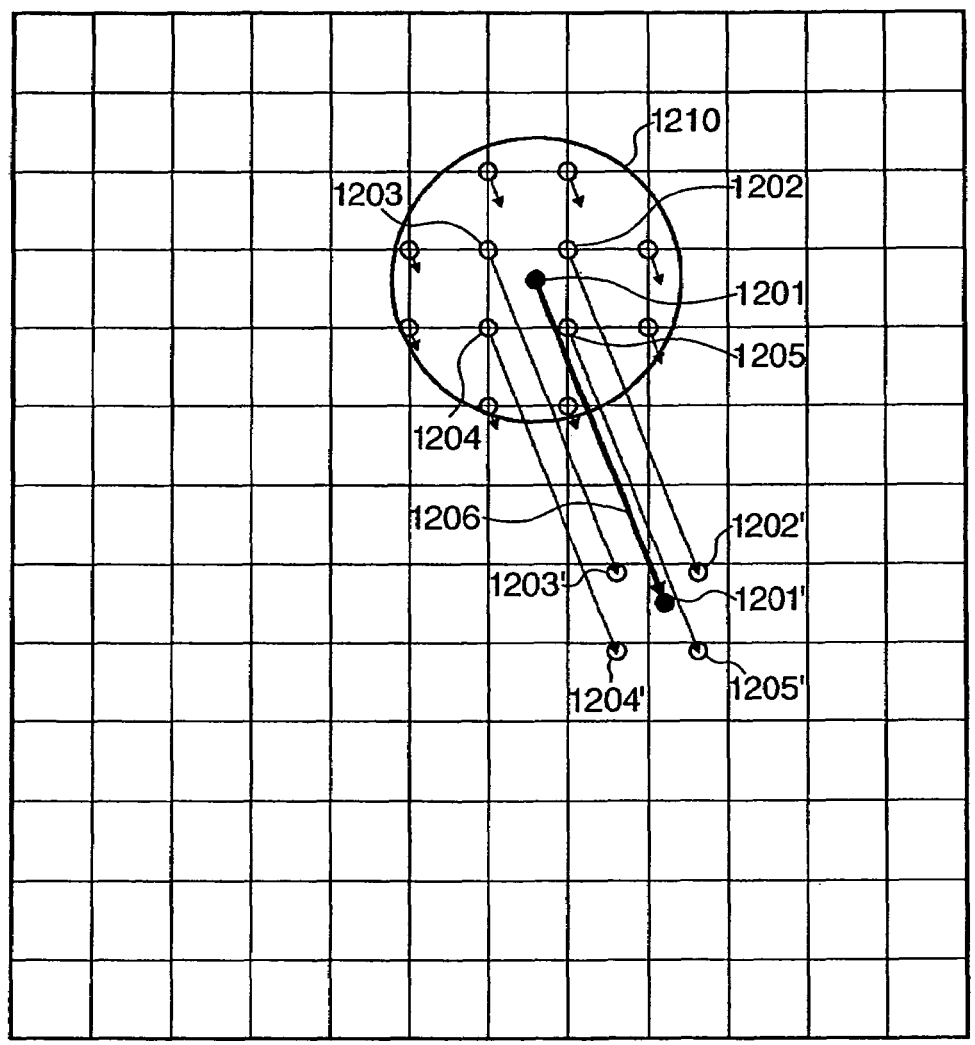
FIG. 10 is a view for explaining an application range of a conversion source color.

Upon depression of either of the up and down arrow button of the cross key 209, the flow advances from step S429 to step S430, and the adjustment function assigned to the up and down arrow buttons at that time is executed (the adjustment function is assigned in step S422). For example, when application range adjustment is set for the up and down arrow buttons, the mark 811 is displayed near the conversion source color display frame 803, as shown in FIG. 8A, to indicate that application range adjustment using the up and down arrow buttons is currently available. In this state, if the up arrow button is pressed, the application range is enlarged. If the down arrow button is pressed, the application range is reduced. The application range is expressed by a level such as −1, 0, +1, or the like. An example of application range adjustment will be described below with reference to FIG. 10. Note that a description of FIG. 10 will be given using a 2D lookup table for the sake of simplicity.

Assume that the color value of a point 1201 is designated as the conversion source color, and the color value of a point 1201' is designated as the conversion destination color. In this case, vertices 1202 to 1204 of grids which include the point 1201 are moved along a vector 1206 which connects the points 1201 and 1201', thus setting values of points 1202' to 1204'. As a level value set as the application range, the size of a circle 1210 is determined. The circle 1210 having a size according to the level value is allocated to have the point 1201 as the center. In this state, grid points, except for the grid points 1202 to 1204 within the circle 1210, are moved in the same direction as that of the vector 1206. However, their sizes (moving amounts) are different. For example, the size assumes a value obtained by multiplying the size of the vector 1206 by a coefficient which assumes 1 at the center of the circle 1210, 0 on the circumference, and becomes smaller according to the distance from the center. For example, let r be the radius of the circle 1210, and p be the distance between a given grid point in the circle 1210 and the grid point 1201. Then, the vector 1206 is multiplied by k=(r−p)/r to determine the moving vector of that grid point. As the level value becomes larger, the radius r of the circle 1210 becomes larger, and the application range of the conversion source color broadens. When the aforementioned processing is applied to the 3D lookup table shown in FIG. 9, the grid can be replaced by the cubic grid, and the circle 1210 can be replaced by a sphere.

As described above, when an enlargement/reduction instruction of the application range is issued, the radius r of the circle 1210 (sphere) is changed in step S430, and the number and change amounts of grid points, which change according to the level values, are changed in step S431. However, even when the level value assumes a lowest value, all vertices which form the cubic grid including the conversion source color must be included.

Figure 11A:
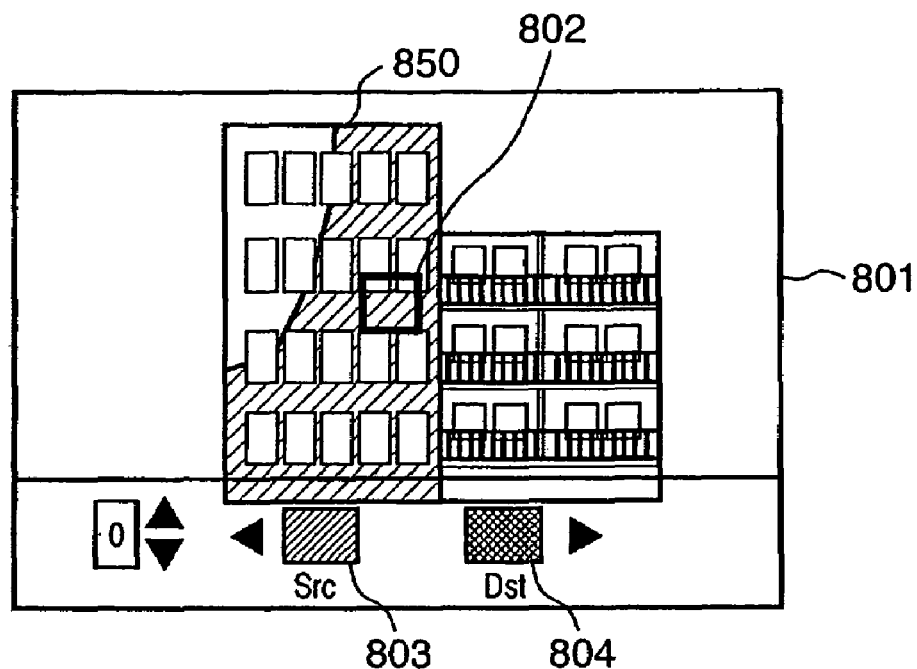
FIGS. 11A and 11B show adjustment examples of the application range of a conversion source color.
Figure 11B:
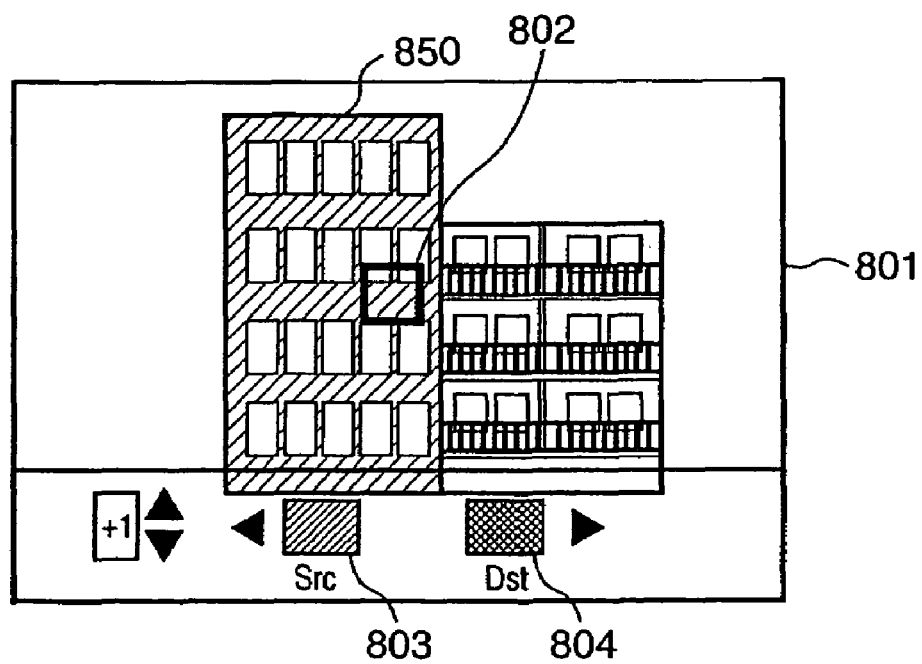

For example, FIG. 11A shows a state wherein the color of the wall of a building 850 is designated as the conversion source color, but the entire building 850 cannot fall within the range of the conversion source color. When the level of the application range is increased to +1 using the up or down arrow button in this state, the range of the conversion source color is enlarged, as shown in FIG. 11B, and adjustment can be attained to include the entire wall of the building 850 in the conversion source color. Conversely, when the level of the application range is decreased, the range of the conversion source color is reduced. For example, when the color of the wall of a building which neighbors the building 850 to be converted is also included in the range of the conversion source color, the range of the conversion source color can be limited to fall within the range of the color of the wall of the building 850.

If destination density adjustment is selected in steps S421 and S422, the mark 812 is displayed near the conversion destination color display frame 804, as shown in FIG. 8B, to indicate that the density of the conversion destination color can be currently adjusted using the up and down arrow buttons. The conversion destination color density is also set using a level value, so that the density of the conversion destination color 1103 (FIG. 10) can be adjusted stepwise. With this adjustment, the color value of the destination color upon generation of the conversion parameters in step S431 is changed. Note that the color value of the destination color moves on the color space along a direction to change the density. Upon changing a hue, the color value moves to go around a hue circle. As a more practical change method of the color value, a color value expressed on a YUV space is converted into a value on an HSV space to change a hue value (H)

and density (S) (gain or chroma saturation), and the changed color value is re-converted into that on the YUV space.

When color capture frame size is designated upon operation of the display button 208 (steps S421 and S422), the size of the color capture frame 802 changes stepwise by operating the up or down arrow button. When color capture frame shape change is designated, the shape of the color capture frame 802 changes like, for example, square→vertically elongated rectangle→horizontally elongated rectangle→triangle→downward triangle→circle, every time the up arrow button is operated. When the down arrow button is operated, the shape of the color capture frame 802 can change in the reverse order. In case of color capture frame size change and color capture frame shape change, the change result is adopted in the next color capture processing operation. Hence, in case of color capture frame size change and color capture frame shape change, the processes in steps S431 and S432 may be skipped.

In the EVF display processing in step S407, data of the conversion result using the 3D lookup table and the image which does not undergo conversion using the 3D lookup table are alternately displayed. In this manner, the color conversion state and that before color conversion can be alternately observed, and the user can recognize the change state as a result of color conversion in real time. Note that such display can be implemented by alternately repeating execution and non-execution of color conversion using the 3D lookup table in the color conversion processor 311.

As described above, according to this embodiment, the conversion source color and conversion destination color can be freely, clearly, and easily set even on the limited user interface of the imaging apparatus, and desired color conversion upon imaging can be implemented by simple operations. Especially, since the conversion source color and conversion destination color are captured using the buttons arranged in the predetermined direction (buttons arranged in the horizontal direction in this embodiment) of the cross key, it can be done with high operability without adding any operation switches. Also, since the buttons arranged in the other direction (buttons arranged in the vertical direction in this embodiment) of the cross key are used in adjustments of the conditions for color capture and parameter settings, the adjustments upon the color capture processing and parameter settings can be naturally done in association with the color capture operation. In this manner, since the cross key is utilized as a user interface to smoothly make settings for the color conversion processing, desired color conversion processing can be easily executed without adding any operation buttons of the imaging apparatus. Furthermore, color conversion can be easily done while the imaging apparatus is held by a hand upon imaging operation.

Since the conversion source color display frame 803 and conversion destination color display frame 804 are arranged in accordance with the arrangement of the buttons of the cross key, which are assigned to capture the conversion source color and conversion destination color, the operations of the cross key can be made more intuitively. For example, which of the right and left arrow buttons is assigned to the conversion source color or the like can be intuitively recognized. In this manner, the user can make intuitive operations by a combination of the cross key and the display mode on the EVF.

When the adjustment function using the up and down arrow buttons is assigned to a single adjustment item (e.g., only application range adjustment), the function switching processing in steps S421 and S422 can be omitted. In this embodiment, the buttons in the horizontal direction of the cross key are used to issue a color capture instruction, and those in the vertical direction are used to issue an adjustment instruction. However, the present invention is not limited to such specific key assignment. For example, the buttons in the vertical direction may be used to issue a color capture instruction, and those in the horizontal direction may be used to issue an adjustment instruction. In this case, the display frames 803 and 804 may be displayed to be arranged in the vertical direction, thus providing a user-friendly interface.

<Modification>

Figure 4C:
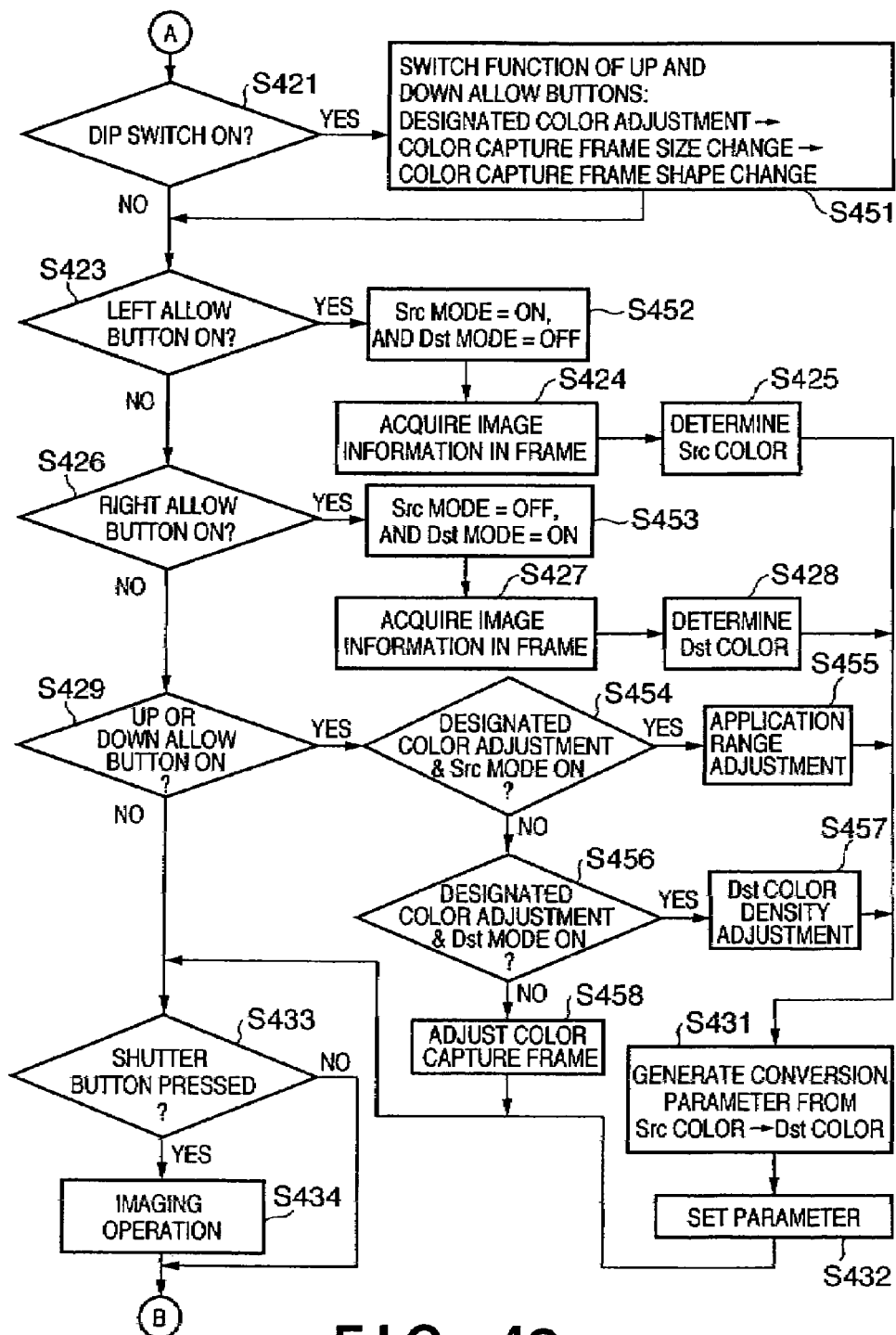
FIG. 4C is a flowchart for explaining processing in the color conversion mode according to a modification.

In this embodiment, the functions assigned to the cross key are switched upon operation of the display button 208. Alternatively, the functions assigned to the up and down arrow buttons may be switched upon operation of the right and left arrow buttons. FIG. 4C is a flowchart for explaining the processing in such case, and replaces that shown in FIG. 4B. In this modification, upon operation of the display button 208 in step S421, the up and down arrow buttons of the cross key are sequentially assigned functions: designated color adjustment→color capture frame size change→color capture frame shape change (step S451). When designated color adjustment is assigned, the up and down arrow buttons function as operation buttons of either application range adjustment or conversion destination color density adjustment described above. Then, these functions are switched in conjunction with the operation of the right and left arrow buttons. That is, since the adjustment functions assigned to the up and down arrow buttons are automatically switched in correspondence with the color capture operation, the operability can be further improved.

Upon depression of the left arrow button, image information in the color capture frame 802 is captured to determine the conversion source color (steps S423 to S425). At this time, an Src mode flag is set ON, and a Dst mode flag is set OFF (step S452). Therefore, if the up or down arrow button is operated after the conversion source color is captured, the application range is adjusted (steps S429, S454, and S455). On the other hand, upon operation of the right arrow button, image information in the color capture frame 802 is captured to determine the conversion destination color (steps S426 to S428). At this time, the Src mode flag is set OFF, and the Dst mode flag is set ON (step S453). Therefore, if the up or down arrow button is operated after the conversion destination color is captured, the density of the conversion destination color is adjusted (steps S429, S454, S456, and S457). The application range adjustment result and the conversion destination color density adjustment result in steps S455 and S457 are immediately reflected to change the 3D lookup table (steps S431 and S432), and are displayed on the EVF. If the Src mode is ON, the mark 811 indicating that the application range can be adjusted using the up and down arrow buttons is displayed. On the other hand, if the Dst mode is ON, the mark 812 indicating that the density of the conversion destination color can be adjusted using the up and down arrow buttons is displayed.

If the color capture frame size or shape change is assigned to the up and down arrow buttons using the display button 208, the size or shape of the color capture frame is changed upon operation of the up or down arrow button (step S458).

As described above, according to this modification, when the conversion source color is captured, the application range can be changed using the up and down arrow buttons. When the conversion destination color is captured, the density of the conversion destination color can be changed using the up and down arrow buttons. For this reason, the functions of the up and down arrow buttons can be appropriately set in the flow of a series of operations, thus improving operability.

In the processing sequence shown in FIG. 4B or 4C, the color is immediately captured in response to the operation of the right or left arrow button. However, the present invention is not limited to this. For example, the left or right arrow button may be used to set a conversion source color capture or conversion destination color standby state, and a color may be actually captured upon depression of the shutter button 203. In this case, in FIG. 4B or 4C, upon operation of the left arrow button, the flow may advance to the conversion source color capture standby state, and steps S424 and S425 may be executed upon depression of the shutter button 203. Also, upon operation of the right arrow button, the flow may advance to the conversion destination color capture standby state, and steps S427 and S428 may be executed upon depression of the shutter button 203.

As described above, the user selects which of the conversion source color and conversion destination color is to be captured by pressing the left or right arrow button, and presses the shutter button while directing the imaging apparatus toward an object from which the color is to be captured. In this way, the user can make the color capture operation by the same operation as in normal imaging. Hence, the user's operability can be improved.

Furthermore, in FIG. 4B or 4C, the adjustment function using the up and down arrow buttons is always enabled. Alternatively, after a color is captured using the left or right arrow button and is settled using another key, the up and down arrow buttons may be enabled. For example, after the conversion source color is captured by the left arrow button and is settled using another key (e.g., the set button 206), adjustment of the application range using the up and down arrow buttons may be enabled. The same applies to the conversion destination color.

When the adjustment function items that can be assigned to the up and down arrow buttons are only application range adjustment and conversion destination color density adjustment, the function switching processing in steps S421 and S422 is omitted.

Figure 12A:
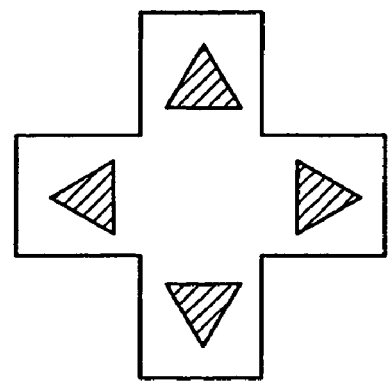
FIGS. 12A to 12D show modification examples of button switches.
Figure 12B:
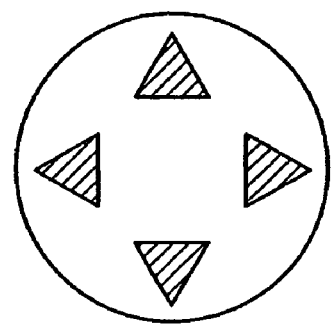
Figure 12C:
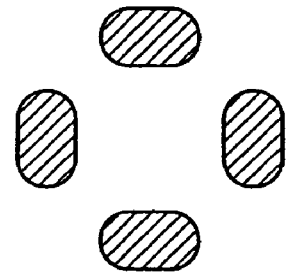
Figure 12D:
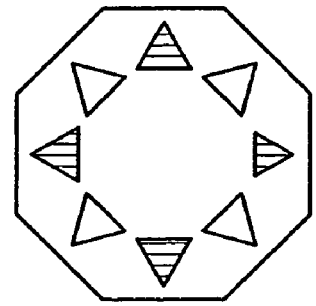

In the above embodiment, the cross key is used as a button group having button switches in a plurality of directions, as shown in FIG. 12A. Alternatively, other operation buttons may be used or dedicated buttons may be provided. For example, a button formed of a member that integrates four directions may be used, as shown in FIG. 12B, or one direction may be assigned to one button, and a plurality of directions may be assigned to a group of a plurality of buttons, as shown in FIG. 12C. Also, the present invention is not limited to the four directions, i.e., up, down, right, and left directions, and any of switches of four or more directions may be used, as shown in FIG. 12D.

The arithmetic operation processing of the color conversion processor 311 in this embodiment uses a 3D lookup table processing and interpolation operation processing. However, the present invention is not limited to such specific processing. For example, processing which can convert the conversion source color into the conversion destination color, e.g., matrix operation processing, which changes matrix operation coefficients for respective color spaces, may be used. As processing using the matrix operation processing, the following processing may be made. That is, in the above embodiment, Y, U, and V signal values after conversion are set on respective grid points in FIG. 9. In the processing using the matrix operation processing, respective grid points store coefficients M11 to M33 in formula (16) below. The coefficients M11 to M33 are determined in accordance with Yin, Uin, and Vin, and formula (16) is calculated to obtain Yout, Uout, and Vout. Note that as determination of M11 to M33, a coefficient stored at a grid point closest to Yin, Uin, and Vin may be calculated, or a coefficient may be calculated by interpolation operations from respective grid points.

$$\begin{vmatrix} Yout \\ Uout \\ Vout \end{vmatrix} = \begin{vmatrix} M11 & M12 & M13 \\ M21 & M22 & M23 \\ M31 & M32 & M33 \end{vmatrix} \begin{vmatrix} Yin \\ Uin \\ Vin \end{vmatrix} \quad (16)$$

Another Embodiment According to Present Invention

Means which form the imaging apparatus and steps of the imaging method according to the embodiment of the present invention can be implemented by running a program stored in a RAM, ROM, and the like of a computer. This program and a computer-readable storage medium that records the program are included in the present invention.

According to the above arrangement, a conversion source color and a conversion destination color can be freely, clearly, and easily set even on the limited user interface of the imaging apparatus, and desired color conversion upon imaging can be implemented by simple operations. Especially, a desired conversion source color and conversion destination color can be designated from an image displayed on the viewfinder screen in real time, and color conversion can be easily designated upon imaging.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-003071 filed on Jan. 7, 2005, which is hereby incorporated by reference herein in its entirety.

What is claimed is:

1. An imaging apparatus for setting color conversion parameters of an image processing unit which processes image data obtained by an imaging unit and which outputs image data to a recording unit that records the output image data, said imaging apparatus comprising:

a display unit configured to display an electronic viewfinder screen on the basis of image data which is captured by the imaging unit and is output from the image processing unit, and to display a frame within the screen;

a first determination unit configured to determine a first color value on the basis of color information included in the frame of an image displayed on the electronic viewfinder screen in response to a first operation input of a first operation switch;

a second determination unit configured to determine a second color value on the basis of color information included in the frame of an image displayed on the electronic viewfinder screen in response to a second operation input of a second operation switch; and a setting unit configured to set color conversion parameters of the image processing unit so as to convert a color within a predetermined range including the first color value into a color within a predetermined range including the second color value on a color space, wherein when said display unit displays a menu screen for setting the image sensing parameters, the first operation switch and the second operation switch are used as direction designation buttons for moving the position of items on the menu screen, and wherein when said display unit displays the electronic viewfinder screen and the frame for the color value determination within the screen, the first operation switch and the second operation switch are used for the color value determination by said first determination unit and said second determination unit and the first operation switch and the second operation switch are not used as direction designation buttons.

2. The apparatus according to claim 1, wherein the first and second operation inputs used by said first and second determination units use inputs of first and second operation switches, which are arranged in a first direction, of a button group having button switches disposed in a plurality of directions.

3. The apparatus according to claim 2, further comprising an adjustment unit configured to adjust conditions associated with settings of the color conversion parameters in accordance with inputs of third and fourth operation switches, which are arranged in a second direction, of the button switches.

4. The apparatus according to claim 3, wherein said adjustment unit can selectively adjust one of a plurality of adjustment items, and the adjustment items are switched by a switch operation other than the button switches.

5. The apparatus according to claim 4, wherein the plurality of adjustment items include a size of the predetermined range including the first color value, a density of the second color value, a size of the frame, and a shape of the frame.

6. The apparatus according to claim 4, wherein the plurality of adjustment items to be adjusted by said adjustment unit include a first adjustment item that adjusts a size of the predetermined range including the first color value, and a second adjustment item that adjusts a density of the second color value, the first adjustment item is selected in response to the input of the first operation switch, and the second adjustment item is selected in response to the input of the second operation switch.

7. The apparatus according to claim 2, wherein said display unit displays a first patch image representing the first color value and a second patch image representing the second color value at predetermined positions together with the electronic viewfinder screen, and the positional relationship between the first and second patch images corresponds to the arrangement of the first and second operation switches.

8. The apparatus according to claim 1, wherein the electronic viewfinder screen alternately displays an image of a color conversion result using the color conversion parameters set by said setting unit, and an image before color conversion.

9. A method of controlling an imaging apparatus which comprises an imaging unit, an image processing unit for processing image data obtained by said imaging unit, and a recording unit for recording image data output from said image processing unit, the method comprising:
   a display step of displaying an electronic viewfinder screen on the basis of image data which is captured by said imaging unit and is output from said image processing unit, and displaying a frame within the screen;
   a first determination step of determining a first color value on the basis of color information included in the frame of an image displayed on the electronic viewfinder screen in response to a first operation input of a first operation switch;
   a second determination step of determining a second color value on the basis of color information included in the frame of an image displayed on the electronic viewfinder screen in response to a second operation input of a second operation switch; and
   a setting step of setting color conversion parameters of said image processing unit so as to convert a color within a predetermined range including the first color value into a color within a predetermined range including the second color value on a color space,
   wherein when said display step displays a menu screen for setting the image sensing parameters, the first operation switch and the second operation switch are used as direction designation buttons for moving the position of items on the menu screen, and
   wherein when said display step displays the electronic viewfinder screen and the frame for the color value determination within the screen, the first operation switch and the second operation switch are used for the color value determination by said first determination unit and said second determination step and the first operation switch and the second operation switch are not used as direction designation buttons.

10. A computer program encoded on a computer-readable medium causing a computer to execute the method according to claim 9.

11. A computer readable medium encoding a computer program causing a computer to execute the method according to claim 9.

* * * * *